United States Patent
Shinno et al.

(10) Patent No.: US 7,582,888 B2
(45) Date of Patent: Sep. 1, 2009

(54) REFLECTION TYPE OPTICAL SENSOR AND METHOD FOR DETECTING SURFACE ROUGHNESS

(75) Inventors: Kazuhisa Shinno, Tokyo (JP); Fumio Ogawa, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 11/623,117

(22) Filed: Jan. 15, 2007

(65) Prior Publication Data
US 2007/0164240 A1     Jul. 19, 2007

(30) Foreign Application Priority Data
Jan. 13, 2006   (JP) .............................. 2006-006350

(51) Int. Cl.
G01N 21/86 (2006.01)
B41J 3/407 (2006.01)
G01B 11/30 (2006.01)

(52) U.S. Cl. .............................. 250/559.4; 250/559.01; 347/106; 356/600

(58) Field of Classification Search .................. 250/559.01–559.49; 358/1.9, 1.18; 399/301; 356/600, 607, 608, 398, 237.2, 237.4, 237.5
See application file for complete search history.

(56) References Cited

U.S. PATENT DOCUMENTS

| 3,614,453 | A | * | 10/1971 | Johnson | 250/559.4 |
|---|---|---|---|---|---|
| 4,589,773 | A | * | 5/1986 | Ido et al. | 356/623 |
| 5,225,689 | A | * | 7/1993 | Buckle et al. | 250/559.4 |
| 5,844,682 | A | * | 12/1998 | Kiyomoto et al. | 356/237.1 |
| 6,084,671 | A | * | 7/2000 | Holcomb | 356/511 |
| 6,291,816 | B1 | * | 9/2001 | Liu | 250/234 |
| 6,432,729 | B1 | * | 8/2002 | Mundt et al. | 438/8 |
| 6,433,350 | B2 | * | 8/2002 | Hwang et al. | 250/559.11 |
| 6,600,167 | B2 | * | 7/2003 | Sano | 250/559.11 |
| 2005/0211931 | A1 | * | 9/2005 | Chelvayohan et al. | 250/559.4 |

FOREIGN PATENT DOCUMENTS

JP    H10-281991    10/1998

* cited by examiner

Primary Examiner—Georgia Y Epps
Assistant Examiner—Jennifer Bennett
(74) Attorney, Agent, or Firm—Cermak Kenealy Vaidya & Nakajima LLP (57) ABSTRACT

A reflection type optical sensor can include a light emitting and receiving unit. The light emitting and receiving unit can include both a light emitting unit and a light receiving unit having light receiving sensitivity to light emitted from the light emitting unit. The light emitting unit and the light receiving unit can be arranged such that the optical axis of the light emitting unit intersects at a predetermined angle with the optical axis of the light receiving unit. The light emitting and receiving unit can be movably supported.

11 Claims, 5 Drawing Sheets

| No. | Type | Name and Model No. | Gloss (measured value) [G] |
|---|---|---|---|
| 1 | Glossy paper 1 | Photo glossy paper GP301 | 68 |
| 2 | Glossy paper 2 | Photo paper for professional use PR101 | 77 |
| 3 | Glossy paper 3 | Super photo paper SP101 | 69 |
| 4 | Glossy paper 4 | Super photo paper-silky SG101 | 48 |
| 5 | Glossy paper 5 | Super photo paper-double sided SP101D | 48 |
| 6 | Ordinary paper 1 | Recycled paper EN100 | 5 |
| 7 | Ordinary paper 2 | Color ordinary paper LC301 | 4 |
| 8 | Ordinary paper 3 | Office planner OFFICE | 4 |
| 9 | Coated paper | Matte photo paper MP101 | 3 |

* Genuine product of Canon Inc.

Fig. 10

*1) Received amount of total reflection / received amount of other reflected light, among received amount of regularly reflected light in the present exemplary embodiment.

*2) Received amount of regularly reflected light (total reflection) / received amount of irregularly reflected light, among received amount of regularly-irregularly reflected light) in comparative example.

REFLECTION TYPE OPTICAL SENSOR AND METHOD FOR DETECTING SURFACE ROUGHNESS

BACKGROUND

This application claims the priority benefit under 35 U.S.C. § 119 of Japanese Patent Application No. 2006-006350 filed on Jan. 13, 2006, which is hereby incorporated in its entirety by reference.

1. Field

The presently disclosed subject matter relates to a reflection type optical sensor which optically detects the surface roughness of an object by detecting the reflection of a light beam irradiated onto the surface of the object, and to a method for detecting the surface roughness of a surface to be measured, using the sensor. More particularly, the presently disclosed subject matter relates to a reflection type optical sensor that can function as a media sensor configured to identify the type of paper (such as ordinary paper, glossy paper, recycled paper, coated paper, and an OHP transparency film) for use in a color copier, a color printer, or the like. The disclosed subject matter can also function as a gloss sensor configured to measure the gloss of a painted surface or the like. In addition, the disclosed subject matter can function as a material identification sensor configured to identify types of materials of various components used in an FA field. In addition to these, the presently disclosed subject matter relates to a method for detecting the surface roughness of a surface to be measured.

2. Description of the Related Art

Figure 1:
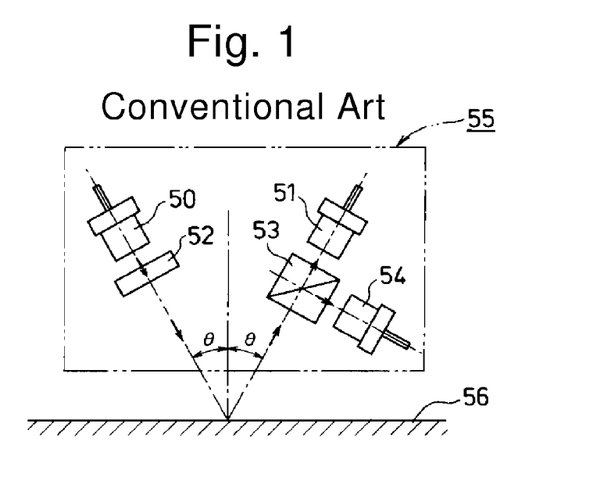
FIG. 1 is a conceptual diagram illustrating a conventional reflection type optical sensor.

FIG. 1 is a schematic diagram of a conventional reflection type optical sensor 55 configured to include a light projection device 50, a light receiving device 51, a polarizing plate 52, a polarizing beam splitter 53, and a correction light receiving device 54. The light projection device 50 is provided with, as a light source, a light emitting device such as a light emitting diode (LED) or a laser diode, which emits a light beam of a single wavelength. The light receiving device 51 is provided with, as a photoreceptor, a light receiving element such as a photodiode or a phototransistor. The light projection device 50 and the light receiving device 51 are arranged such that the incident angle θ of the optical axis of the light projection device 50 is the same as the reflection angle θ of the optical axis of the light receiving device 51. Here, the incident angle and the reflection angle are determined with respect to the normal to the surface of an object. The light projection device 50 is provided with the polarizing plate 52 disposed on the optical axis of the light projection device 50 in the light irradiating direction. The light receiving device 51 is provided with the polarizing beam splitter 53 disposed on the optical axis of the light receiving device 51 on the light incident side. Furthermore, the correction light receiving device 54 is disposed at a position at which it can receive the light beam that is separated and reflected by the polarizing beam splitter 53.

In the reflection type optical sensor 55 having the above described configuration, the light beam emitted from the light projection device 50 which has a single wavelength is polarized when the light beam passes through the polarizing plate 52. In this case, the polarized light beam has a plane of vibration in a specific direction. This polarized light beam is irradiated onto an object surface 56. Then, the polarized light beam reflected from the object surface 56 is separated by the polarizing beam splitter 53, and the separated light beams are detected by the light receiving device 51 and the correction light receiving device 54, respectively, to produce output signals.

The reflection type optical sensor 55 is configured such that, among the polarized light beams reflected from the surface 56 of the object to be measured, the reflected polarized light beam that has the same plane of vibration as that of the polarized light beam which passed through the polarizing plate 52 is detected by the light receiving device 51 through the polarizing beam splitter 53. Furthermore, the reflected polarized light beam that has a different plane of vibration from that of the polarized light beam which passed through the polarizing plate 52 is detected by the correction light receiving device 54 through the polarizing beam splitter 53.

Therefore, by computing the ratio of the output of the light receiving device 51 based on the amount of the received polarized light beam to the output of the correction light receiving device 54 based on the amount of the received polarized light beam, the surface roughness of the object to be measured can be detected (see, for example, Japanese Patent Laid-Open Publication No. Hei 10-281991).

The reflection type optical sensor as described above is capable of identifying different types of printing media such as ordinary paper, glossy paper, recycled paper, coated paper, and an OHP transparency film. Furthermore, since the detection resolution is very high, the different types of glossy paper which is one of the printing media can be more particularly identified based on the gloss thereof.

However, the above described reflection type optical sensor has polarizing optical elements (the polarizing plate and the polarizing beam splitter) as components. Therefore, a problem exists in that the manufacturing cost associated with multiple elements is high.

SUMMARY

The presently disclosed subject matter has been developed in view of the foregoing and other problems and characteristics of the related art. According to an aspect of the presently disclosed subject matter, a surface roughness measurement sensor can be configured to have high detection accuracy and can be manufactured at low cost.

According to another aspect of the presently disclosed subject matter, a reflection type optical sensor can include a light emitting and receiving unit. The light emitting and receiving unit can include a light emitting unit having an optical axis and a light receiving unit having an optical axis. The light receiving unit can be configured to be sensitive to light emitted from the light emitting unit. The light emitting unit and the light receiving unit can also be arranged such that the optical axis of the light emitting unit in a light emission direction intersects at a predetermined angle the optical axis of the light receiving unit in a light reception direction. Furthermore, the light emitting and receiving unit can be movably supported.

The reflection type optical sensor as described above can further include an arithmetic processing unit which performs arithmetic processing of a detected amount of first light and a detected amount of second light, wherein the first light is emitted from the light emitting unit with a surface of an object positioned such that the surface contains an intersection of the optical axes and is perpendicular to a bisector passing through the intersection and bisecting an intersecting angle between the optical axes, the first light then being reflected from the surface of the object and being detected by the light receiving unit, and wherein the second light is emitted from the light emitting unit with the light emitting and receiving unit brought close to or away from the surface of the object by moving the light emitting and receiving unit along the bisector by a certain distance, the second light then being reflected from the surface of the object and being detected by the light receiving unit. Thereby, surface roughness of the object can be detected.

In the reflection type optical sensor as described above, the light emitting unit may include one of a light emitting diode and a laser diode, and the light receiving unit may include one of a photodiode and a phototransistor.

According to another aspect of the presently disclosed subject matter, a reflection type optical sensor can include: a light emitting and receiving unit including a light emitting unit having an optical axis and a light receiving unit having an optical axis and light receiving sensitivity to light emitted from the light emitting unit, the light emitting unit and the light receiving unit being arranged such that the optical axis of the light emitting unit in a light emission direction intersects at a predetermined angle the optical axis of the light receiving unit in the light reception direction; and a supporting member which supports an object to be measured such that a surface of the object is movable in a direction perpendicular to the surface.

The reflection type optical sensor as described above can further include an arithmetic processing unit which performs arithmetic processing of a detected amount of first light and a detected amount of second light, wherein the first light is emitted from the light emitting unit with the surface of the object positioned such that the surface contains an intersection of the optical axes and is perpendicular to a bisector passing through the intersection and bisecting an intersecting angle between the optical axes, the first light then being reflected from the surface of the object and being detected by the light receiving unit, and wherein the second light is emitted from the light emitting unit with the light emitting and receiving unit brought close to or away from the surface of the object by moving the supporting member for the object along the bisector by a certain distance, the second light then being reflected from the surface of the object and being detected by the light receiving unit. Thereby, surface roughness of the object can be detected.

In the reflection type optical sensor as described above, the light emitting unit may include one of a light emitting diode and a laser diode, and the light receiving unit may include one of a photodiode and a phototransistor.

According to still another aspect of the presently disclosed subject matter, a reflection type optical sensor can include a light emitting unit having an optical axis and two light receiving units each having an optical axis and light receiving sensitivity to light emitted from the light emitting unit. In this reflection type optical sensor, the light emitting unit and the two light receiving units can be arranged such that each of the optical axes of the light receiving units intersects the optical axis of the light emitting unit at a substantially identical predetermined angle, thereby detecting reflected light.

The reflection type optical sensor as described above can further include an arithmetic processing unit which performs arithmetic processing of a detected amount of first light and a detected amount of second light, the first light being emitted from the light emitting unit with the surface of the object positioned such that the measuring surface contains a first intersection of the optical axis of the light emitting unit and the optical axis of one of the two light receiving units and is perpendicular to a bisector passing through the first intersection and bisecting an intersecting angle at the first intersection and with a second intersection of the optical axis of the light emitting unit and the optical axis of the other light receiving unit positioned closer to the reflection type optical sensor than the first intersection is, wherein the first light is then reflected from the first intersection on the surface of the object and is detected by the one of the light receiving units, and wherein the second light is emitted from the light emitting unit, is reflected from the surface of the object, passes through the second intersection, and is detected by the other light receiving unit. Thereby, surface roughness of the object can be detected.

In the reflection type optical sensor as described above, the light emitting unit may include one of a light emitting diode and a laser diode, and the light receiving unit may include one of a photodiode and a phototransistor.

According to still another aspect of the presently disclosed subject matter, a method for detecting surface roughness of a measuring surface can include: irradiating an object to be measured with light from a light emitting device and receiving reflected light from the object by a light receiving device; storing an output from the light receiving device in a first storage area; changing a distance between the light emitting device and the object; irradiating the object with light from the light emitting device and receiving reflected light from the object by the light receiving device; storing an output from the light receiving device in a second storage area; performing computation using the outputs stored in the first and second storage areas, respectively; and outputting results of the computation.

According to a still further aspect of the presently disclosed subject matter, a method for detecting surface roughness can include: placing a light emitting and receiving device including a light emitting device and a light receiving device at a predetermined position relative to an object to be measured; irradiating the object with light from the light emitting device and receiving reflected light from the object by the light receiving device; outputting a signal from the light receiving device in accordance with an amount of the light received; storing an output from the light receiving device in a first storage area; changing a distance between the light emitting and receiving device and the object; irradiating the object with light from the light emitting device and receiving reflected light from the measuring object by the light receiving device; outputting a signal from the light receiving device in accordance with an amount of the light received; storing an output from the light receiving device in a second storage area; performing predetermined computation using the outputs stored in the first and second storage areas, respectively; outputting results of the computation; and outputting data for surface roughness based on the outputted results.

According to still another aspect of the presently disclosed subject matter, a method for identifying a material can include: placing a light emitting and receiving device including a light emitting device and a light receiving device at a predetermined position relative to an object to be measured; irradiating the object with light from the light emitting device and receiving reflected light from the object by the light receiving device; outputting a signal from the light receiving device in accordance with an amount of the light received; storing an output from the light receiving device in a first storage area; changing a distance between the light emitting and receiving device and the object; irradiating the object with light from the light emitting device and receiving reflected light from the object by the light receiving device; outputting a signal from the light receiving device in accordance with an amount of the light received; storing an output from the light receiving device in a second storage area; performing predetermined computation using the outputs stored in the first and second storage areas, respectively;

outputting results of the computation; and comparing the outputted results with predetermined standard data and estimating a type of the object, whereby material type identification of the object is performed.

The reflection type optical sensor of the presently disclosed subject matter can have a relatively simple configuration. Specifically, a single wavelength light beam emitted from a light emitting device can be irradiated onto the surface of an object to be measured. Then, two regularly reflected light beams reflected from different positions on the irradiated surface are detected by two light receiving devices or by a light receiving device having two light receiving units mounted in one package. In this instance, each of the above light receiving devices has light receiving sensitivity to the light emitted from the light emitting device. The detected amounts of the light beams are subjected to arithmetic processing, whereby the surface roughness of the measuring object can be detected.

Therefore, a reflection type optical sensor which has high detection accuracy and which can be manufactured at low cost can be provided as a surface roughness measurement sensor.

BRIEF DESCRIPTION OF THE DRAWINGS

These and other characteristics, features, and advantages of the presently disclosed subject matter will become clear from the following description with reference to the accompanying drawings, wherein:

FIGS. 2A to 2C show an exemplary embodiment of a reflection type optical sensor made in accordance with principles of the presently disclosed subject matter, wherein

FIGS. 4A and 4B show another exemplary embodiment of a reflection type optical sensor made in accordance with principles of the presently disclosed subject matter, wherein

FIGS. 5A and 5B show still another exemplary embodiment of a reflection type optical sensor made in accordance with principles of the presently disclosed subject matter, wherein

DETAILED DESCRIPTION OF EXEMPLARY EMBODIMENTS

Hereinafter, exemplary embodiments of the presently disclosed subject matter will be described in further detail with reference to FIGS. 2A to 10. In these drawings, the same or similar parts are designated by the same numerals. The exemplary embodiments described hereinafter are specific examples of the presently disclosed subject matter, and thus include various technical features and characteristics. However, the scope of the presently disclosed subject matter is not limited to the exemplary embodiments.

Figure 2A:
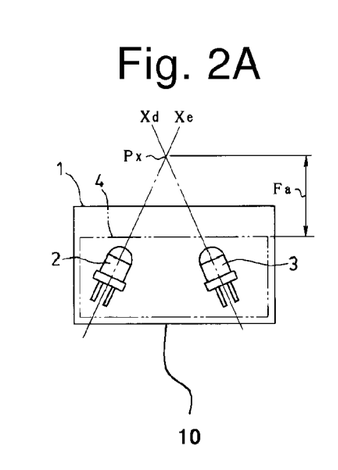
FIG. 2A is a conceptual diagram of an embodiment of the reflection type optical sensor.
Figure 2B:
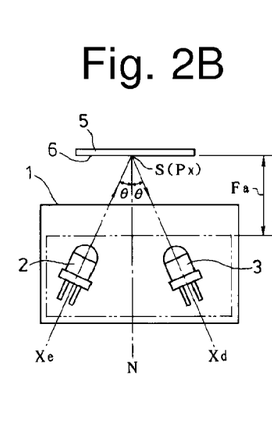
FIGS. 2B and 2C are conceptual diagrams during measurement.
Figure 2C:
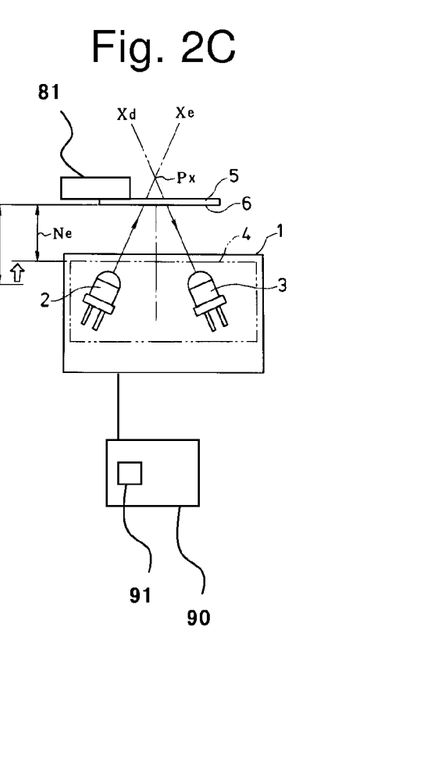

FIGS. 2A to 2C are conceptual diagrams illustrating an exemplary embodiment of a reflection type optical sensor made in accordance with principles of the presently disclosed subject matter. A reflection type optical sensor 1 in this exemplary embodiment can be configured to include a light emitting and receiving unit 4 as shown in FIG. 2A disposed adjacent to a housing 10. The light emitting and receiving unit 4 can be composed of a light emitting device 2 and a light receiving device 3. The light emitting device 2 can include a light emitting unit such as a light emitting diode (LED), a laser diode, etc., which emits light with a single wavelength. The light emitting unit can be mounted on the light emitting device 2 as a bare chip (not shown). The light receiving device 3 can include a light receiving unit such as a photodiode, a phototransistor, etc., which detects light. The light receiving unit can be mounted on the light receiving device 3 as a bare chip (not shown). The light emitting device 2 and the light receiving device 3 constituting the light emitting and receiving unit 4 can be disposed such that the optical axes $X_e$ and $X_d$ of the light emitting and receiving devices 2 and 3, respectively, intersect at a point $P_x$ separated from the light emitting and receiving unit 4 by a predetermined distance $F_a$ (see FIG. 2A).

When the surface roughness of an object to be measured is measured, the reflection type optical sensor 1 configured as described above can be first disposed as shown in FIG. 2B. Specifically, the reflection type optical sensor 1 is disposed such that the cross-point $P_x$ of the light emitting and receiving optical axes is located at a measurement point S on a surface 6 of the measuring object 5 to be measured for surface roughness. At the same time, the angle of the optical axis $X_e$ of the light emitting device 2 with respect to a normal SN at the measurement point S is adjusted to be the same as the angle of the optical axis $X_d$ of the light receiving device 3 with respect to the normal SN (i.e., the angles are set to the same value θ).

When the light emitting device 2 is turned on in this state, the light emitted from the light emitting device 2 reaches the measurement point S (at which the cross-point $P_x$ of the light emitting and receiving optical axes is also located) on the surface 6 of the object 5 to be measured. This light is reflected by the surface at the measurement point S, and the regularly reflected light is incident on the light receiving device 3 and then detected by the same. At this time, an output signal $V_{of}$ in accordance with the received light amount is delivered from the light receiving device 3.

Next, as shown in FIG. 2C, the light emitting and receiving unit 4 can be moved toward the object 5 to be measured, for example, by moving the light emitting and receiving unit 4 with respect to housing 10. Accordingly, the surface 6 of the object 5 is closer to the reflection type optical sensor 1 than is the cross-point $P_x$ of the light emitting and receiving optical axes with respect to the optical sensor 1. At this time, the light emitting and receiving unit 4 is moved such that it is separated from the object 5 by a predetermined distance. The light emitting device 2 is then turned on again in this state. The light from the light emitting device 2 is reflected by the surface 6 of the object 5, and the regularly reflected light is incident on the light receiving device 3 and detected by the same. At this time, an output signal $V_{on}$ in accordance with the received light amount is sent out from the light receiving device 3.

Subsequently, the ratio or difference between the obtained output signals $V_{of}$ and $V_{on}$ is computed. The state of the surface of the measured object can be estimated, for example, based on the results while consulting a data table prepared in advance. In this manner, media type identification, paper type identification, material type identification, and the like can be performed. For example, an arithmetic processing unit 90 can be provided that has a storage device 91 with various storage areas therein. The arithmetic processing unit 90 can be configured as an internal or external device for calculating and computing the necessary values and comparing and determining the necessary information for determining a desired output, e.g., type of media, type of paper, material, etc.

Alternatively, as shown in FIG. 2C, a supporting member 81 can be provided that is movably configured with respect to the light emitting and receiving unit 4. Thus, instead of moving the light emitting and receiving unit 4 relative to a housing 10, the supporting member 81 can move relative to the light emitting and receiving unit 4 such that the object to be measured also moves toward and away the light emitting and receiving unit 4. The supporting member 81 can be configured to hold an object to be measured such that a surface of the object can be moved along a normal or perpendicular axis relative to the surface of the object and towards or away from the light emitting and receiving unit 4. In addition, it is conceivable that both the supporting member 81 and the light emitting and receiving unit 4 move simultaneously to cause the relative motion between the object to be measured and the light emitting and receiving unit 4.

Figure 3:
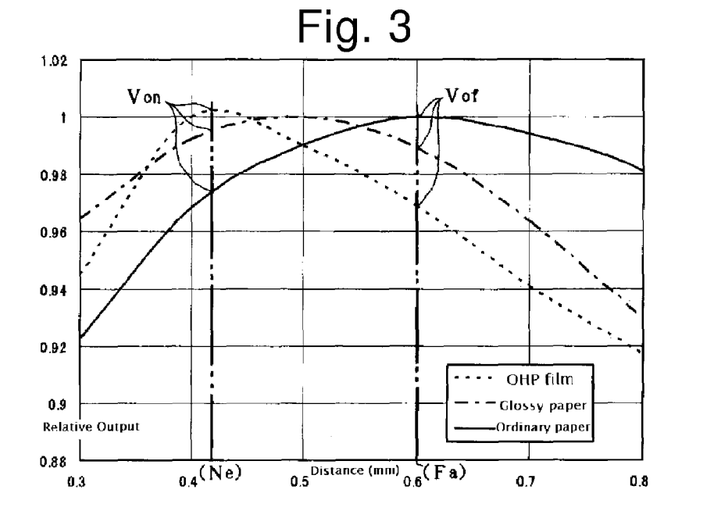
FIG. 3 is a graph showing the measurement results for the exemplary embodiment of FIGS. 2A-C.

FIG. 3 is a graph showing the relationship between the distance from the light emitting and receiving unit 4 of the reflection type optical sensor 1 to the surface 6 of the object 5 to be measured and the output signal delivered from the light receiving device 3 for three media including ordinary paper, glossy paper, and an OHP transparency film. This relationship is referred to as "distance-output characteristics" and hereinafter abbreviated as distance characteristics.

The horizontal axis represents the distance between the light emitting and receiving unit and the surface of the object, and the vertical axis represents the relative output from the light receiving devices. As can be seen from the graph, when the surface state of the object to be measured is close to that of a mirror surface, as that of an OHP transparency film, the peak of the distance characteristics is present on the side on which the distance between the light emitting and receiving unit and the surface of the object to be measured is short. Furthermore, when the surface state of the object is close to that of a diffusive surface, as that of ordinary paper, the degree of light diffusion becomes large. As the degree of light diffusion increases, the peak of the distance characteristics approaches the cross-point of the light emitting and receiving optical axes.

When the relationship of $V_{of}/V_{on}>1$ holds, the object to be measured is identified as ordinary paper. When the relationship of $V_{of}/V_{on}\approx 1$ holds, the object is identified as glossy paper. Furthermore, when the relationship of $V_{of}/V_{on}<1$ holds, the object is identified as an OHP transparency film.

Therefore, the determination of the relationship between $V_{of}$ and $V_{on}$ can identify the media type of the object to be measured.

In the configuration of this exemplary embodiment, the object to be measured is fixed, and the light emitting and receiving unit is movable so as to adjust the distance between the light emitting and receiving unit and the surface of the object. However, the presently disclosed subject matter is not limited to the above configuration. The reflection type optical sensor may be configured such that the light emitting and receiving unit is fixed and the object to be measured is movable. Furthermore, the reflection type optical sensor may be configured such that both the light emitting and receiving unit and the object are movable. Specifically, so long as the relative position or distance between the light emitting and receiving unit and the object can be adjusted, any of the configurations can be employed.

Figure 4A:
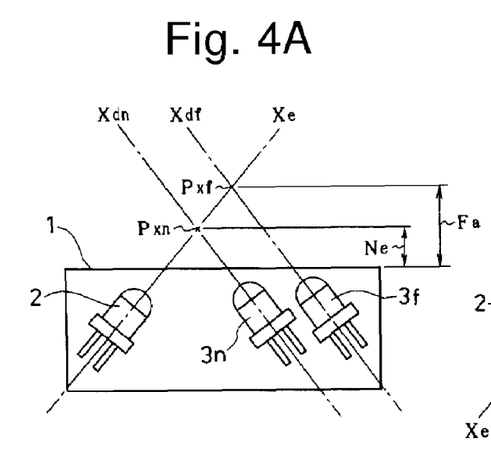
FIG. 4A is a conceptual diagram of the embodiment of the reflection type optical sensor.
Figure 4B:
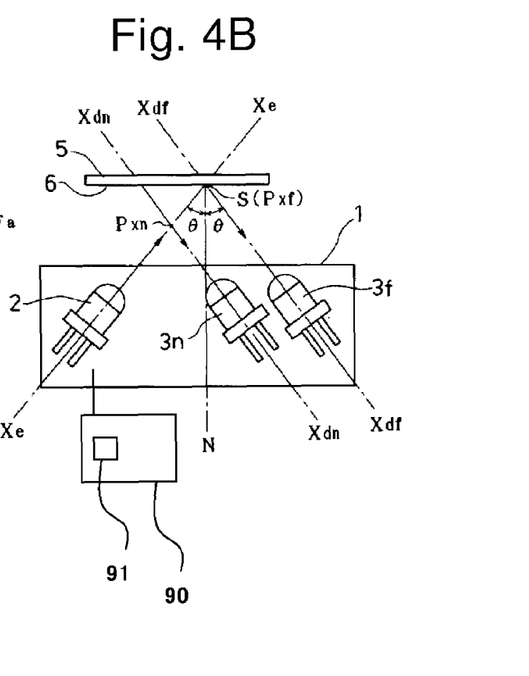
FIG. 4B is a conceptual diagram during measurement.

FIGS. 4A and 4B are conceptual diagrams illustrating another exemplary embodiment of a reflection type optical sensor made in accordance with principles of the presently disclosed subject matter. The exemplary embodiment of FIGS. 4A-B is based on a detection principle that is the same as that in the previous exemplary embodiment of FIGS. 2A-C. In the previous exemplary embodiment, a structure is employed in which the light emitting and receiving unit composed of a pair of the light emitting and receiving devices is movable with respect to the surface of the object to be measured. However, in this exemplary embodiment, as shown in FIG. 4A, the reflection type optical sensor 1 can be composed of a single light emitting device and two light receiving devices $3f$ and $3n$. These devices can be fixed inside the reflection type optical sensor 1. Furthermore, the reflection type optical sensor 1 may have an arithmetic processing unit 90, and the arithmetic processing unit 90 may have a storage device 91 configured as an internal or external device.

The two light receiving devices $3f$ and $3n$ can be disposed such that respective optical axes $X_{df}$ and $X_{dn}$ of the devices $3f$ and $3n$ are approximately parallel to each other. The light emitting device 2 and the light receiving device $3f$ can be disposed such that the respective optical axes $X_e$ and $X_{df}$ of the devices 2 and $3f$ intersect at a point $P_{xf}$ separated from the reflection type optical sensor 1 by a predetermined distance $F_a$. Furthermore, the light emitting device 2 and the light receiving device $3n$ can be disposed such that the respective optical axes $X_e$ and $X_{dn}$ of the devices 2 and $3n$ intersect at a point $P_{xn}$ separated from the reflection type optical sensor 1 by a predetermined distance $N_e$. In addition to these, the cross-points $P_{xf}$ and $P_{xn}$ of the light emitting and receiving optical axes can be positioned from the reflection type optical sensor 1 side in order of $P_{xn}$ and $P_{xf}$.

A description will now be given of the case in which the surface roughness of an object is measured by means of the reflection type optical sensor 1 having the above described configuration. The reflection type optical sensor 1 is disposed as shown in FIG. 4B. Specifically, the reflection type optical sensor 1 is disposed such that the cross-point $P_{xf}$ of the light emitting and receiving optical axes, at which the optical axis $X_e$ of the light emitting device 2 intersects the optical axis $X_{df}$ of the light receiving device $3f$, is located at the measurement point S on the surface 6 of the object 5 to be measured for surface roughness. At the same time, the angle of the optical axis $X_e$ of the light emitting device 2 with respect to the normal SN at the measurement point S is adjusted to be the same as the angle of the optical axis $X_{df}$ of the light receiving device $3f$ with respect to the normal SN (i.e., the angles are set to the same value θ). In this state, the cross-point $P_{xn}$ of the light emitting and receiving optical axes, at which the optical axis $X_e$ of the light emitting device 2 intersects the optical axis $X_{dn}$ of the light receiving device 3n, is positioned between the surface 6 of the object 5 and the reflection type optical sensor 1.

When the light emitting device 2 is turned on in this state, the light emitted from the light emitting device 2 reaches the measurement point S (at which the cross-point $P_{xf}$ of the light emitting and receiving optical axes is also located) on the surface 6 of the object 5. This light is reflected by the surface at the measurement point S, and the regularly reflected light is incident on the light receiving device 3f and detected by the same. At this time, an output signal $V_{of}$ in accordance with the received light amount is delivered from the light receiving device 3f.

At the same time, part of the regularly reflected light is incident on the light receiving device 3n and detected by the same. Here, as described above, the regularly reflected light is the light having been emitted from the light emitting device 2, having reached the measurement point S (at which the cross-point $P_{xf}$ of the light emitting and receiving optical axes is also located) on the surface 6 of the object 5, and having been reflected by the surface at the measurement point S. At this time, an output signal $V_{on}$ in accordance with the received light amount is delivered from the light receiving device 3n.

Before the actual measurement, measurement is performed on an object which has certain surface roughness serving as the standard surface roughness, and adjustment is performed such that the output signals $V_{of}$ and $V_{on}$ of the light receiving devices 3f and 3n, respectively, are of the same level. In the predetermined arithmetic processing unit, the ratio or difference between the output signals $V_{of}$ and $V_{on}$ of the light receiving devices 3f and 3n, respectively (the signals are obtained during the above actual measurement) is computed in real time or after the signals are stored in a storage device. The obtained results are compared with the values in a table prepared in advance and stored in the storage device to thereby estimate the state of the surface of the object to be measured. In this manner, media type identification, paper type identification, material type identification, and the like can be achieved.

For example, glossy paper can be used as an object which has certain surface roughness serving as the standard surface roughness. Then, measurement is performed on the glossy paper in advance, and adjustment is performed such that the respective output signals $V_{of}$ and $V_{on}$ of the light receiving devices 3f and 3n are of the same level. In this state, measurement is performed on an object to be measured for media type identification. At this time, when the relationship of $V_{of}/V_{on} > 1$ holds, the object is identified as ordinary paper. When the relationship of $V_{of}/V_{on} \approx 1$ holds, the object is identified as glossy paper. Further, when the relationship of $V_{of}/V_{on} < 1$ holds, the object is identified as an OHP transparency film. Therefore, the determination of the relationship between $V_{of}$ and $V_{on}$ can achieve media type identification.

The reflection type optical sensor of this exemplary embodiment has a simple structure since a movable member is not required. Therefore, it can be manufactured at low cost.

Figure 5A:
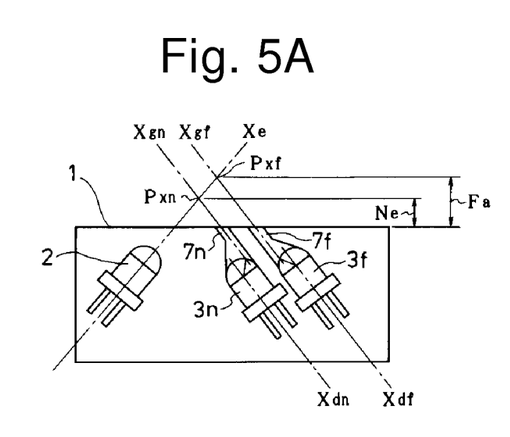
FIG. 5A is a conceptual diagram of the embodiment of the reflection type optical sensor.
Figure 5B:
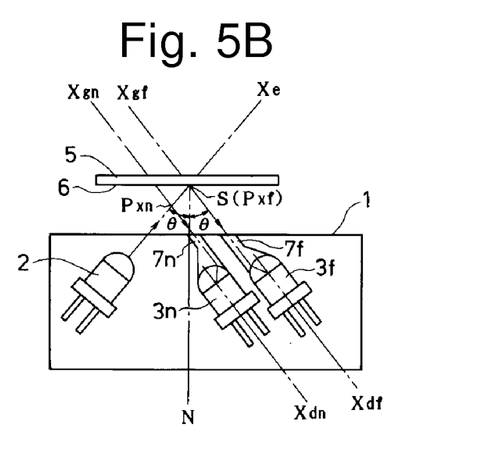
FIG. 5B is a conceptual diagram during measurement.

FIGS. 5A and 5B are conceptual diagrams illustrating still another exemplary embodiment of a reflection type optical sensor made in accordance with principles of the presently disclosed subject matter. As in the exemplary embodiment of FIGS. 4A-B described above, the reflection type optical sensor 1 of this exemplary embodiment can be composed of a single light emitting device 2 and two light receiving devices 3f and 3n. Furthermore, the light emitting device 2 and the light receiving devices 3f and 3n can be fixed inside the reflection type optical sensor 1. Moreover, the two light receiving devices 3f and 3n are disposed such that respective optical axes $X_{df}$ and $X_{dn}$ of the devices 3f and 3n are approximately parallel to each other.

This exemplary embodiment is different from the previous exemplary embodiment above at least in that guides 7f and 7n made of a transparent material are provided on the light receiving devices 3f and 3n, respectively, as shown in FIG. 5A. The light emitting device 2 and the light guide 7f are disposed such that the optical axis $X_e$ of the light emitting device 2 and an optical axis $X_{gf}$ of the light guide 7f intersect at a point $P_{xf}$ separated from the reflection type optical sensor 1 by a predetermined distance $F_a$. Furthermore, the light emitting device 2 and the light guide 7n are disposed such that the optical axis $X_e$ of the light emitting device 2 and an optical axis $X_{gn}$ of the light guide 7n intersect at a point $P_{xn}$ separated from the reflection type optical sensor 1 by a predetermined distance $N_e$. In addition to these, the cross-points $P_{xf}$ and $P_{xn}$ of the light emitting and receiving optical axes are positioned from the reflection type optical sensor 1 side in order of $P_{xn}$ and $P_{xf}$.

Furthermore, the optical axis $X_{df}$ of the light receiving device 3f and the optical axis $X_{gf}$ of the light guide 7f provided on the light receiving device 3f are not necessarily on the same line. Similarly, the optical axis $X_{dn}$ of the light receiving device 3n and the optical axis $X_{gn}$ of the light guide 7n provided on the light receiving device 3n are not necessarily on the same line. When the optical axis of each of the light guides and the optical axis of the corresponding light receiving device are not on the same line, the distance between the optical axis $X_{gf}$ of the light guide 7f and the optical axis $X_{gn}$ of the light guide 7n can be made smaller than the distance between the optical axis $X_{df}$ of the light receiving device 3f and the optical axis $X_{dn}$ of the light receiving device 3n. This configuration contributes to a reduction in the size of the reflection type optical sensor.

When the surface roughness of an object is measured by the reflection type optical sensor 1 as described above, the reflection type optical sensor 1 can be disposed as shown in FIG. 5B. Specifically, the reflection type optical sensor 1 is disposed such that the cross-point $P_{xf}$ of the light emitting and receiving optical axes, at which the optical axis $X_e$ of the light emitting device 2 intersects the optical axis $X_{gf}$ of the light guide 7f provided on the light receiving device 3f, is located at the measurement point S on the surface 6 of the object 5 to be measured for surface roughness. Furthermore, the reflection type optical sensor 1 is placed such that the angle of the optical axis $X_e$ of the light emitting device 2 with respect to the normal SN at the measurement point S can be substantially the same as the angle of the optical axis $X_{gf}$ of the light guide 7f with respect to the normal SN (i.e., the angles are set to substantially the same value θ). Therefore, the cross-point $P_{xn}$ of the light emitting and receiving optical axes, at which the optical axis $X_e$ of the light emitting device 2 intersects the optical axis $X_{gn}$ of the light guide 7n, is positioned between the surface 6 of the object 5 and the reflection type optical sensor 1.

When the light emitting device 2 is turned on, the light emitted from the light emitting device 2 reaches the measurement point S (at which the cross-point $P_{xf}$ of the light emitting and receiving optical axes is also located) on the surface 6 of the object 5 to be measured. This light is reflected by the surface at the measurement point S, and the regularly reflected light is guided through the light guide 7f and is incident on the light receiving device 3f and detected by the same. At this time, an output signal $V_{of}$ in accordance with the received light amount is delivered from the light receiving device 3f.

At the same time, part of the regularly reflected light is guided through the light guide 7n and is incident on the light receiving device 3n and detected by the same. Here, as described above, the regularly reflected light is the light having been emitted from the light emitting device 2, having reached the measurement point S (at which the cross-point $P_{xf}$ of the light emitting and receiving optical axes is also located) on the surface 6 of the object 5, and having been regularly reflected by the surface at the measurement point S. At this time, an output signal $V_{on}$ in accordance with the received light amount is delivered from the light receiving device 3n.

Subsequently, the output signals $V_{of}$ and $V_{on}$ are processed as in the exemplary embodiment of FIGS. 4A-B above, and therefore the detailed description is omitted here.

Each of the light guides 7f and 7n provided on the light receiving devices 3f and 3n, respectively, may be integrated by connecting a light receiving device and a light guide which are formed independently. Alternatively, each of the light guides 7f and 7n may be integrally formed when the corresponding light receiving device is manufactured. For example, the light receiving device can be integrally formed with the light guide 7f.

Figure 6:
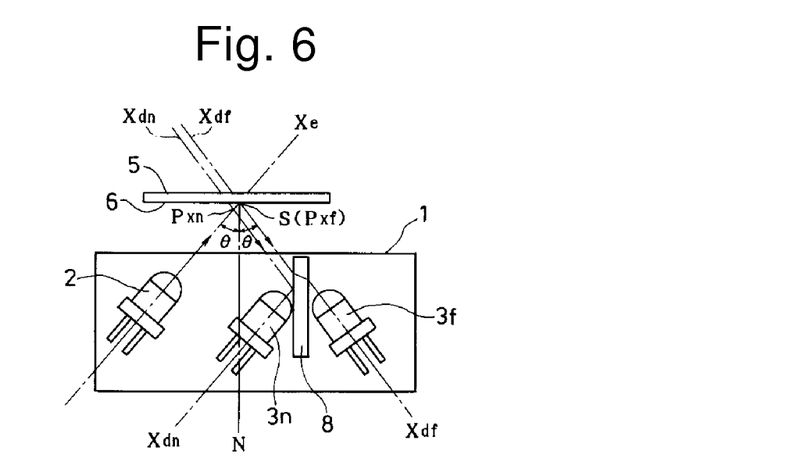
FIG. 6 is a conceptual diagram during measurement of yet another exemplary embodiment of a reflection type optical sensor made in accordance with principles of the presently disclosed subject matter.

FIG. 6 is a conceptual diagram illustrating yet another exemplary embodiment of a reflection type optical sensor made in accordance with principles of the presently disclosed subject matter. This exemplary embodiment can include some of the features described with respect to the embodiment of FIGS. 5a-B above. Specifically, the reflection type optical sensor 1 can include a single light emitting device 2 and two light receiving devices 3f and 3n. Furthermore, the light emitting device 2 and the light receiving devices 3f and 3n can be fixed inside the reflection type optical sensor 1.

The exemplary embodiment of FIG. 6 is different from the above-described exemplary embodiments at least in that a beam splitter 8 is provided between the two light receiving devices 3f and 3n.

When the surface roughness of an object is measured by the reflection type optical sensor 1 of this exemplary embodiment, the reflection type optical sensor 1 is placed such that the cross-point $P_{xf}$ of the light emitting and receiving optical axes is located at the measurement point S on the surface 6 of the object 5 to be measured for surface roughness. In this instance, in this exemplary embodiment, the cross-point $P_{xf}$ is a point at which the optical axis $X_e$ of the light emitting device 2 intersects an optical axis $X_{df}$ extension, which is the extension of the optical axis $X_{df}$ of the light receiving device 3f and reaches the surface 6 of the object 5 after passing through the beam splitter 8. Furthermore, the reflection type optical sensor 1 is placed such that the angle of the optical axis $X_e$ of the light emitting device 2 with respect to the normal SN at the measurement point S on the surface 6 of the object 5 is substantially the same as the angle of the optical axis $X_{df}$ extension with respect to the normal SN (i.e., the angles are set to substantially the same value θ). In this exemplary embodiment, the cross-point $P_{xn}$ of the light emitting and receiving optical axes is a point at which the optical axis $X_e$ of the light emitting device 2 intersects an optical axis $X_{dn}$ extension, which is the extension of the optical axis $X_{dn}$ of the light receiving device 3n after being reflected from the beam splitter 8. Therefore, the cross-point $P_{xn}$ is positioned between the surface 6 of the object 5 and the reflection type optical sensor 1.

When the light emitting device 2 is turned on, the light emitted from the light emitting device 2 reaches the measurement point S (at which the cross-point $P_{xf}$ of the light emitting and receiving optical axes is also located) on the surface 6 of the object 5 to be measured. This light is reflected by the surface at the measurement point S, and the regularly reflected light passes through the beam splitter 8 and is incident on the light receiving device 3f and detected by the same. At this time, an output signal $V_{of}$ in accordance with the received light amount is delivered from the light receiving device 3f.

At the same time, part of the regularly reflected light is reflected from the beam splitter 8 and is detected by the light receiving device 3n. Here, as described above, the regularly reflected light is the light having been emitted from the light emitting device 2, having reached the measurement point S (at which the cross-point $P_{xf}$ of the light emitting and receiving optical axes is also located) on the surface 6 of the object 5, and having been reflected by the surface at the measurement point S. At this time, an output signal $V_{on}$ in accordance with the received light amount is delivered from the light receiving device 3n.

Subsequently, the output signals $V_{of}$ and $V_{on}$ can be processed as in the previous exemplary embodiments above, and therefore a detailed description thereof is omitted.

In the configuration of this exemplary embodiment, the distance between the regularly reflected light detected by the light receiving device 3f and that detected by the light receiving device 3n can be reduced. As in the previous exemplary embodiment, this configuration contributes to a reduction in the size of the reflection type optical sensor 1.

Figure 7:
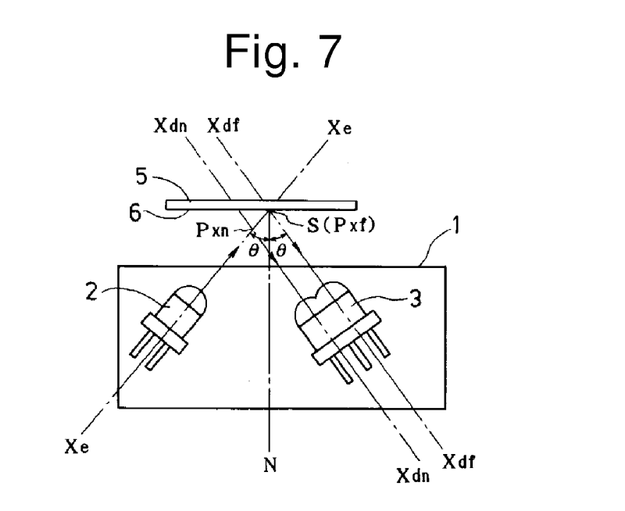
FIG. 7 is a conceptual diagram during measurement illustrating still another exemplary embodiment of a reflection type optical sensor made in accordance with principles of the presently disclosed subject matter.

FIG. 7 is a conceptual diagram illustrating still another exemplary embodiment of a reflection type optical sensor made in accordance with principles of the presently disclosed subject matter. In this exemplary embodiment, the reflection type optical sensor 1 can be composed of a single light emitting device 2 and a single light receiving device 3. Furthermore, the light emitting device 2 and the light receiving device 3 can be fixed inside the reflection type optical sensor 1.

In the configuration of this exemplary embodiment, the light receiving device 3 has two independent light receiving units, and the two light receiving units are contained in a single package. The configuration of the two light receiving units can be achieved using a monolithic type device, in which two independent light receiving areas are provided in a single semiconductor substrate, using a hybrid type device, in which two light receiving units each having a single light receiving area are disposed in a semiconductor substrate, or by using other similar element(s). When the monolithic type element is employed, a device configured to improve an S/N ratio by preventing the interference between the light receiving areas can be provided. Specifically, a light shielding member can be provided between the two light receiving areas to isolate the light incident on each of the light receiving areas. When the hybrid type element is employed, a device configured to improve an S/N ratio by preventing the interference between the light receiving areas can be provided. Specifically, a light shielding member can be provided between the two light receiving units to isolate the light incident on each of the light receiving units.

Various characteristics and qualities of the optical sensor 1 of FIG. 7 can be the same as or similar to those described with respect to the exemplary embodiment of FIGS. 4A-B described above. Specifically, the positional relationship between the object 5 to be measured and the reflection type optical sensor 1, the measurement method, the measurement signal processing, and the like can be similar or the same. Thus, a detailed description thereof is omitted.

In this exemplary embodiment, the light receiving device can be composed of two independent light receiving units mounted in one package. Therefore, the size of the reflection type optical sensor can be reduced. Furthermore, since the positional accuracy of the two independent light receiving units can be improved, the detection accuracy and the detection reproducibility can be improved.

In the above exemplary embodiment, each of the light emitting device and the light receiving device may be independently disposed. However, these light emitting and receiving devices may be provided by combining them with an optical component such as a lens or a light guide, such as the light guide shown in FIG. 5. In this case, the combination of the light emitting device and an optical component is referred to as a light emitting apparatus, and the combination of the light receiving device and an optical component is referred to as a light receiving apparatus.

Furthermore, the optical axes of the optical components form a predetermined angle with a measuring surface. Therefore, no particular limitation is imposed on the directions of the optical axes of the light emitting and receiving devices each combined with the corresponding optical component with respect to the measuring surface (i.e., the directions of the optical axes of the chips mounted on the device).

For example, in the reflection type optical sensor shown in FIGS. 5A-B, the optical axes of the two light receiving devices (e.g., bare chips mounted in the light receiving devices) are not necessarily parallel to each other, so long as each of the optical axes of the two light guides forms a predetermined angle with a measuring surface.

Some exemplary embodiments of the reflection type optical sensor made in accordance with the presently disclosed subject matter have been described above in detail. A description will now be given of a method for detecting the surface roughness of a surface to be measured using the reflection type optical sensor of these exemplary embodiments.

In an exemplary embodiment of the method, the surface roughness can be detected through the following procedures: placing a light emitting and receiving device including a light emitting device and a light receiving device at a predetermined position relative to an object to be measured; irradiating the object with light from the light emitting device and receiving reflected light from the object by the light receiving device; outputting a signal from the light receiving device in accordance with an amount of the light received; storing an output from the light receiving device in a first storage area; changing a distance between the light emitting and receiving device and the object; irradiating the object with light from the light emitting device and receiving reflected light from the measuring object by the light receiving device; outputting a signal from the light receiving device in accordance with an amount of the light received; storing an output from the light receiving device in a second storage area; performing predetermined computation using the outputs stored in the first and second storage areas, respectively; outputting the results of the computation; and, forming data for surface roughness using only the outputted results or forming data for surface roughness of the measuring object by comparing the outputted results with predetermined standard data. Furthermore, the type of the object to be measured can be estimated based on the types of standard data.

In an embodiment of a reflection type optical sensor made in accordance with the presently disclosed subject matter, media type identification, paper type identification, material type identification, and the like can be performed as follows. Among the light emitted from the light emitting device and reflected by the surface of an object to be measured, part of the reflected light and another part of the reflected light are received by respective light receiving devices. Output signals corresponding to the amounts of the light received by each of the respective light receiving devices is normalized. The results obtained by computing the ratio or difference between the output signals after the normalization are compared with a table prepared in advance, whereby the state of the surface of the object is estimated.

In the above procedure, when a plurality of light receiving devices are provided, a plurality of output data values can be processed in real time without storing the data values in a plurality of storage areas. In this manner, the processing time can be shortened.

Figure 8:
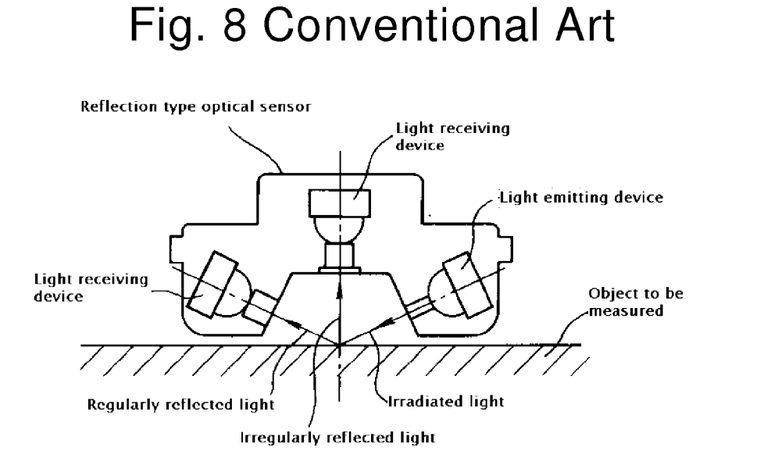
FIG. 8 is a schematic diagram illustrating a reflection type optical sensor of a comparative example.

A conventional reflection type optical sensor shown in FIG. 8 and a reflection type optical sensor having one of the configurations of the present exemplary embodiments were tested in order to compare their characteristics. Here, in the conventional reflection type optical sensor shown in FIG. 8, the ratio or difference is computed between the amount of regularly reflected light emitted from a light emitting device and reflected by the surface of an object to be measured and the amount of irregularly reflected light reflected irregularly by the surface. Then, media type identification, paper type identification, material type identification, and the like are performed based on the obtained results.

Figure 9:
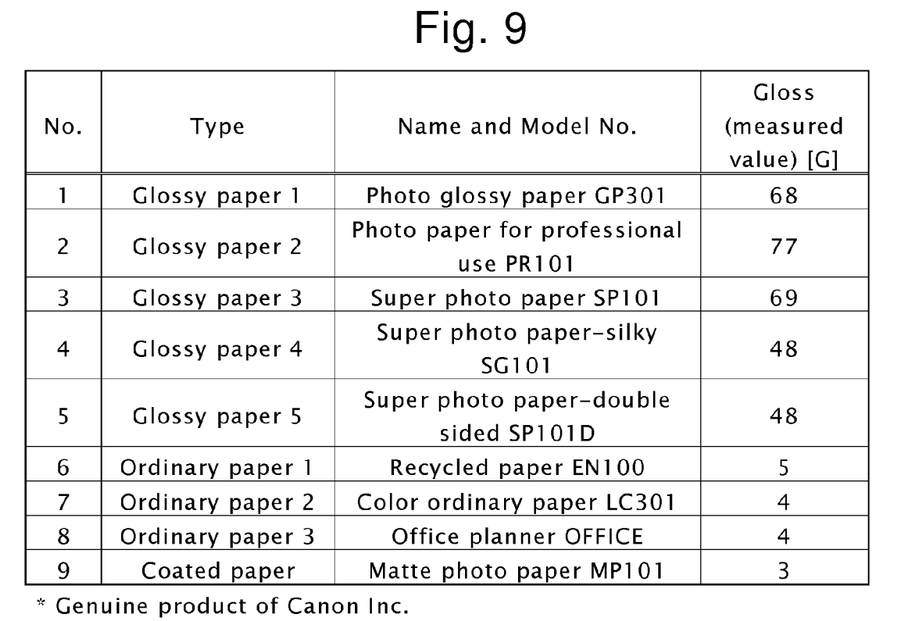
FIG. 9 is a table showing the specifications of exemplary objects to be measured, and which are used in exemplary measurement experiments.
Figure 10:
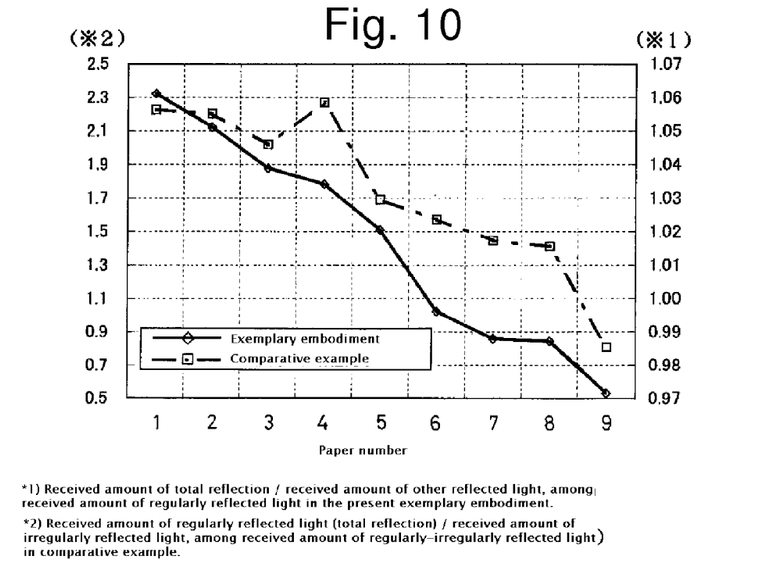
FIG. 10 is a graph showing characteristics identified by an exemplary sensor made in accordance with principles of the presently disclosed subject matter as compared to characteristics measured by the comparative example sensor of FIG. 8.

FIG. 10 shows the identification characteristics obtained by measuring an object using the reflection type optical sensor having one of the configurations of the present exemplary embodiments and the reflection type optical sensor having the configuration of the comparative example shown in FIG. 8. FIG. 9 shows the types of the objects with corresponding identifying numbers. In FIG. 10, the horizontal axis represents the measuring paper number. Among the vertical axes, the right vertical axis represents the ratio between the amount of regularly reflected light and the amount of other reflected light, which are the two reflected light amounts obtained in the reflection type optical sensor of the present exemplary embodiments. In addition, the left vertical axis represents the ratio between the amount of regularly reflected light and the amount of irregularly reflected light, which are the reflected light amounts obtained in the reflection type optical sensor of the comparative example.

As is clear from the results shown in FIG. 10, the linearity of the identification characteristics of the reflection type optical sensor of the present exemplary embodiment is significantly improved as compared to that of the identification characteristics of the reflection type optical sensor of the comparative example. Therefore, it can be seen that the detailed identification of the type of glossy paper, which is difficult in the comparative example, can be made by the reflection type optical sensor of the present exemplary embodiments.

Furthermore, at the boundary between glossy paper and ordinary paper, the amount of change in the ratio between the two regularly reflected light amounts obtained in the reflection type optical sensor of the present exemplary embodiments is larger than that in the ratio of the amount of the regularly reflected light and the amount of the irregularly reflected light which are obtained in the reflection type optical sensor of the comparative example. This shows that the detection resolution of the reflection type optical sensor of the present exemplary embodiments can be higher than that of the reflection type optical sensor of the comparative example.

As has been described in detail, the reflection type optical sensor of the present disclosed subject matter utilizes the property that the difference in surface state serves as the difference in the distance characteristics of the reflection type optical sensor employing regularly reflected light as a detection medium. Thus, a reflection type optical sensor having high resolution with a simple configuration (composed of a single light emitting device and two light receiving devices) can be achieved at low cost.

While there has been described what are at present considered to be exemplary embodiments of the invention, it will be understood that various modifications may be made thereto, and it is intended that the appended claims cover such modifications as fall within the true spirit and scope of the invention.

What is claimed is:

1. A reflection type optical sensor, comprising:
a light emitting unit having an optical axis;
two light receiving units each having an optical axis and configured to sense light received from the light emitting unit; and
a light receiving guide located adjacent each of the light receiving units, each of the light receiving guides having an optical light emitting axis, wherein the optical light emitting axes of the light receiving guides are spaced apart from each other along their length by a first distance, and the optical axes of the light receiving units are spaced apart from each other along their length by a second distance, wherein the first distance is less than the second distance such that the optical light emitting axes of the light receiving guides are closer together than are the optical axes of the light receiving units, wherein
the light emitting unit and the two light receiving units are configured such that each of the optical axes of the light receiving units intersects the optical axis of the light emitting unit at a substantially identical predetermined angle, thereby detecting reflected light.

2. The reflection type optical sensor according to claim 1, further comprising:
an arithmetic processing unit configured to perform arithmetic processing of a detected amount of first light and a detected amount of second light, the first light being emitted from the light emitting unit such that when a surface of an object to be measured is positioned such that the surface is located substantially at a first intersection of the optical axis of the light emitting unit and the optical axis of one of the two light receiving units and is perpendicular to a bisector passing through the first intersection and bisecting an intersecting angle at the first intersection, and a second intersection of the optical axis of the light emitting unit and the optical axis of the other light receiving unit is positioned closer to the reflection type optical sensor than the first intersection is, the first light is reflected from the surface of the object at the first intersection and detected by the one of the two light receiving units, the second light being emitted from the light emitting unit and configured to be reflected from the surface of the object, to pass through the second intersection, and to be detected by the other light receiving unit, whereby surface roughness of the object can be detected.

3. The reflection type optical sensor according to claim 1, wherein the light emitting unit includes at least one of a light emitting diode and a laser diode, and wherein the light receiving unit includes at least one of a photodiode and a phototransistor.

4. The reflection type optical sensor according to claim 1, further comprising:
a beam splitter located between the two light receiving units.

5. The reflection type optical sensor according to claim 1, wherein the two light receiving units are configured as a single monolithic unit.

6. The reflection type optical sensor according to claim 2, wherein the light emitting unit includes at least one of a light emitting diode and a laser diode, and wherein the light receiving unit includes at least one of a photodiode and a phototransistor.

7. A method for detecting surface roughness, comprising:
providing a light emitting and receiving unit including a light emitting unit and a light receiving unit, an object to be measured, and a storage device including a first storage area and a second storage area;
placing the light emitting and receiving unit at a predetermined position relative to the object to be measured;
irradiating the object with light from the light emitting unit and receiving reflected light from the object by the light receiving unit;
outputting a first signal from the light receiving unit in accordance with an amount of the reflected light received;
storing a first output from the light receiving unit in the first storage area;
changing a distance between the light emitting and receiving unit and the object;
irradiating the object with light from the light emitting unit after the distance is changed and receiving second reflected light from the object by the light receiving unit;
outputting a second signal from the light receiving unit in accordance with an amount of the second reflected light received;
storing a second output from the light receiving unit in the second storage area;
performing predetermined computation using the first and second outputs stored in the first and second storage areas, respectively;
outputting results of the computation; and
outputting data for surface roughness based on the outputted results.

8. A method for identifying a material, comprising:
providing a light emitting and receiving unit including a light emitting unit and a light receiving unit, an object to be measured, and a storage device including a first storage area and a second storage area;
placing the light emitting and receiving unit at a predetermined position relative to the object to be measured;
irradiating the object with light from the light emitting unit and receiving reflected light from the object by the light receiving unit;
outputting a first signal from the light receiving unit in accordance with an amount of the reflected light received;
storing a first output from the light receiving unit in the first storage area;
changing a distance between the light emitting and receiving unit and the object;
irradiating the object with light from the light emitting unit after the distance is changed and receiving second reflected light from the object by the light receiving unit;
outputting a second signal from the light receiving unit in accordance with an amount of the second reflected light received;
storing a second output from the light receiving unit in a second storage area;
performing predetermined computation using the first and second outputs stored in the first and second storage areas, respectively;
outputting results of the computation; and comparing the outputted results with predetermined standard data and estimating a type of the object, whereby material type identification of the object is performed.

9. The method for identifying a material of claim 7, wherein changing a distance between the light emitting and receiving unit and the object includes simultaneously moving the light emitting unit and the light receiving unit in a same direction.

10. The method for identifying a material of claim 7, wherein changing a distance between the light emitting and receiving unit and the object includes moving at least one of the light emitting unit and the light receiving unit in a linear direction along the distance.

11. The reflection type optical sensor of claim 1, wherein at least one of the light emitting unit and the light receiving units is configured to move in a linear direction with respect to a housing to which both the light emitting unit and the light receiving units are attached.

* * * * *